Nov. 15, 1932. F. C. TAYLOR Re. 18,658

SAFETY CONTROL FOR FLUID FUEL VALVES

Original Filed May 27, 1925 3 Sheets-Sheet 1

INVENTOR
Frank C. Taylor:
BY
Davis & Simons
His ATTORNEYS

Nov. 15, 1932. F. C. TAYLOR Re. 18,658

SAFETY CONTROL FOR FLUID FUEL VALVES

Original Filed May 27, 1925 3 Sheets-Sheet 2

INVENTOR
Frank C. Taylor

BY
Davis & Simmons
his ATTORNEYS

Nov. 15, 1932. F. C. TAYLOR Re. 18,658

SAFETY CONTROL FOR FLUID FUEL VALVES

Original Filed May 27, 1925 3 Sheets-Sheet 3

INVENTOR
Frank C. Taylor

BY
Davis & Emmons
his ATTORNEYS

Reissued Nov. 15, 1932 Re. 18,658

UNITED STATES PATENT OFFICE

FRANK C. TAYLOR, OF ROCHESTER, NEW YORK, ASSIGNOR TO AUTOMATIC PRODUCTS COMPANY, OF MILWAUKEE, WISCONSIN, A CORPORATION OF WISCONSIN

SAFETY CONTROL FOR FLUID FUEL VALVES

Original No. 1,559,018, dated October 27, 1925, Serial No. 33,309, filed May 27, 1925. Application for reissue filed September 17, 1932. Serial No. 633,696.

The present invention relates to a safety control for fluid fuel valves, and an object of the invention is to provide an inexpensive and reliable means which will shut off a gas or liquid fuel supply to a burner in the event a dangerous or other undesired condition exists, as, for instance, the failure of the electric supply thus rendering the thermostat inoperative, the extinguishing of the pilot flame thus causing unburned gas to fill the combustion space, low water in the boiler causing damage to the latter, high temperature, or high pressure. Another object of the invention is to provide a simple controlling means which will utilize a closed circuit for holding the means against operation to close the valve, until an undesired condition exists. Still another object of the invention is to provide a system in which any suitable standard valve operating means may be employed in connection with the safety controlling means. A further object of the invention is to provide a mechanism which is self-contained, simple in operation and readily applicable to a valve to cause the valve to remain in the position to which said valve is shifted by such mechanism.

To these and other ends, the invention consists of certain parts and combinations of parts, all of which will be hereinafter described: the novel feature being pointed out in the appended claims.

In the drawings:

Fig. 3 is an interior view of the valve operating mechanism, the valve being in open position;

Figure 1:
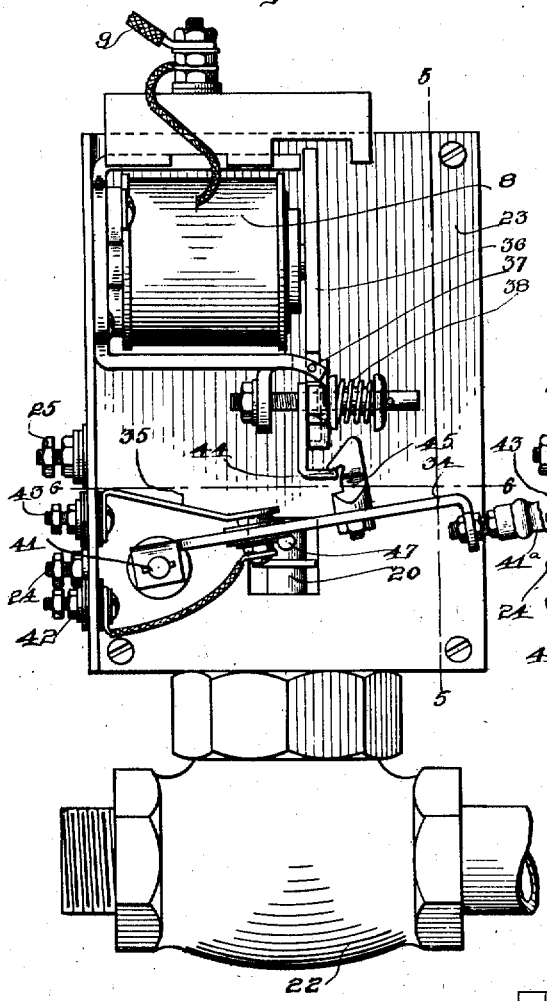
Fig. 1 is a side view of the mechanism showing the safety device shifted to permit a free movement of the valve.
Figure 2:
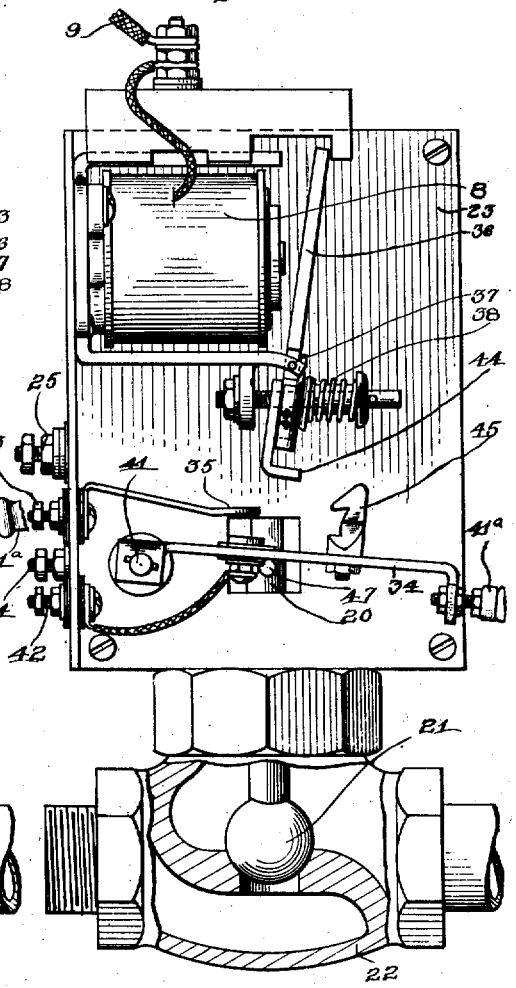
Fig. 2 is a similar view showing the safety device holding the valve in closed position.

Referring to the illustrated embodiment of the invention, 22 indicates a valve casing in which a valve member 21 is arranged to control the flow through the valve. In all of the figures, except Figure 8, the valve member moves downwardly to close the valve, whereas in Figure 8 the downward movement opens the valve for a purpose which will be hereinafter set forth.

Any suitable operating means for the valve may be employed. In this instance, to the stem 20 of the valve 21 the core of a two-winding solenoid is secured, the windings being indicated at 12 and 13. This solenoid is arranged in a casing 23 surmounting the valve and having a binding post 24 electrically connected thereto, and two binding posts 25 insulated therefrom. The two binding posts 25 each connect with a terminal of one of the windings 12 and 13 of the solenoid. The other terminal of the winding 12 is in the form of a yielding contact 19, whereas the other terminal of the winding 13 is in the form of a yielding contact 18.

Pivotally mounted in the casing 23 at 27 is a lever 26 which is in electrical connection with the binding post 24 and has a cross piece 28 mounted thereof and adapted to co-operate at one end with the terminal 18 and at the other end with the terminal 19. The member 26 has a loose pivotal connection 29 with the stem 20 so that as the stem and the core of the solenoid move upwardly under the action of a lifting winding 12, the current to such lifting winding will be broken, due to the fact that the cross piece 28 moves out of contact with the terminal 19, thus permitting the movement of the valve stem after the latter has been shifted. When the valve stem 20 moves downwardly, the cross piece 28 is carried out of engagement with the terminal 18, so as to cut out the lowering coil 13. With the end in view of holding the valve member yieldingly in its shifted position, there is provided a bar 31 fulcrumed at 30 in the end of the lever 26 and fulcrumed at 32 in a resilient or spring plate 33. It is apparent that, as the lever 26 moves in either direction, it imparts a swinging and lengthwise movement to the bar 31 and after a certain point in the movement is reached the resilient plate 33 tends to kick the valve member 21 to the limit of its movement and hold it resiliently in its shifted position.

Figure 7:
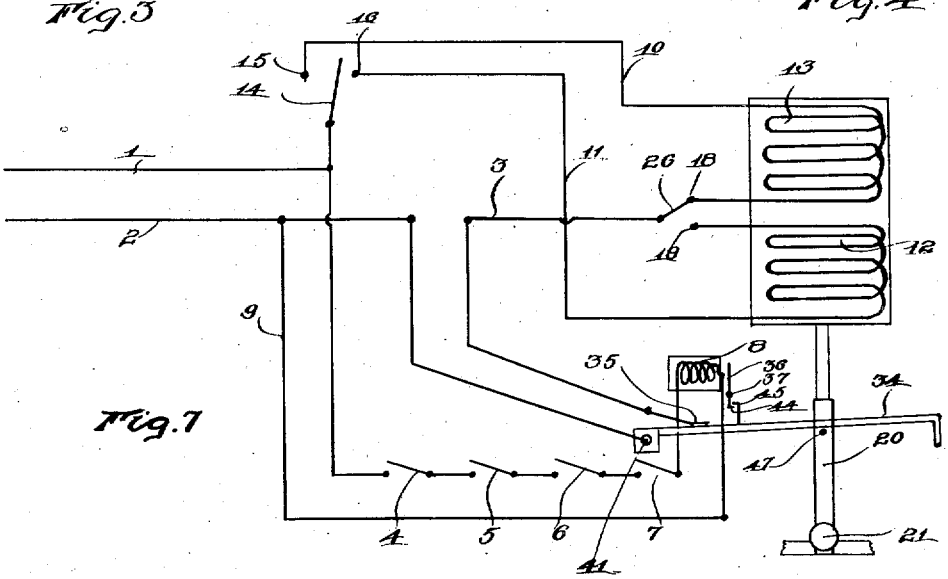
Fig. 7 is a diagram illustrating a system constructed in accordance with this invention.
Figure 5:
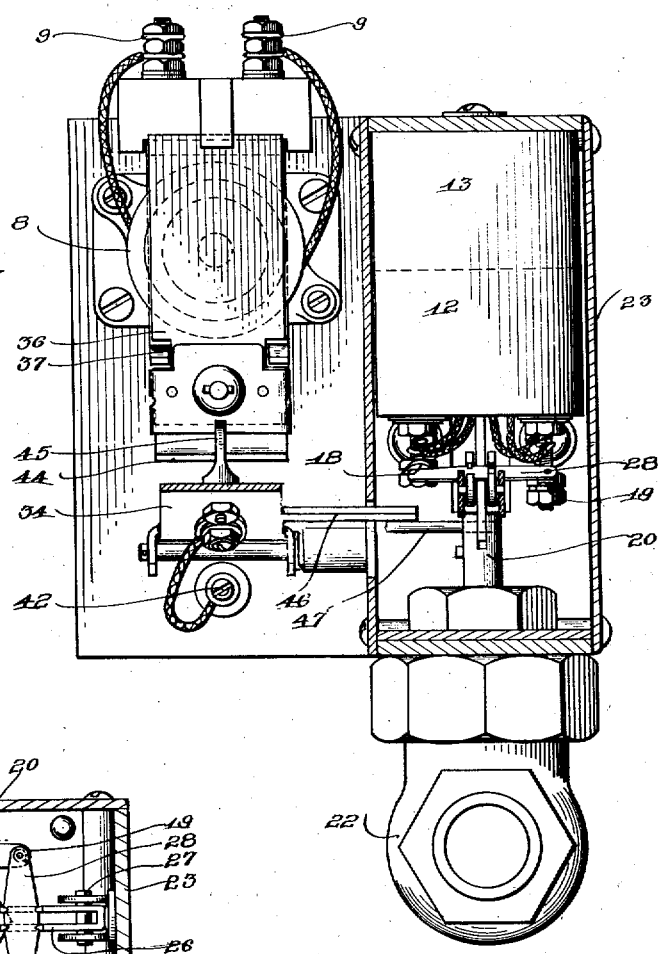
Figure 6:
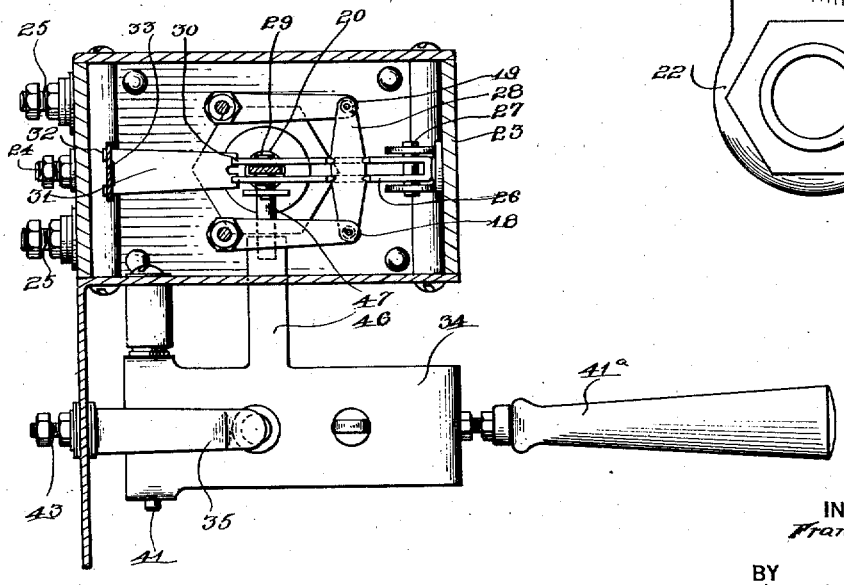
Fig. 6 is a section on the line 6—6, Fig. 1.

The windings 12 and 13 receive energy from a suitable source of electricity, as, for instance, through two line wires 1 and 2, see Fig. 7, connecting with two circuits 10 and 11, one of which includes the winding 13 and the other of which includes the winding 12 and both having a common return 3. The circuits 10 and 11 may be thermostatically controlled and to this end a thermostat of any suitable construction has its heat affected member 14 movable between two terminals 15 and 16 connected respectively with the circuits 10 and 11. The return conductor 3 of these circuits is connected to the switch member 26 by means of the binding post 24.

Figure 4:
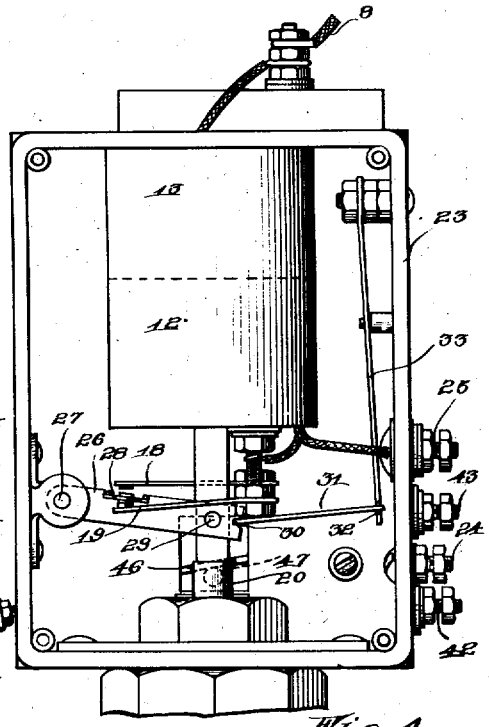
Fig. 4 is a similar view with the valve in closed position.

The valve operating mechanism hereinbefore described, illustrated in Figs. 3 and 4 is not claimed per se therein and it will be understood that this invention is not limited to any particular type of valve operating mechanism.

The safety controlling means, which forms the features of this invention, has two characteristics. First, it acts on the valve to cause the valve to move to one position, say either closed or opened, when an undesired condition exists, and holds the valve in this position until the safety control is reset manually. The safety control, however, cannot be reset manually until the undesired condition has been overcome and when reset permits the operation of the fuel valve through the usual valve operating means. Second, when the safety control operates to effect the shifting of the valve on an undesired condition, the valve operating mechanism is rendered inoperative, as by breaking the circuit to the operating means if electrically controlled.

In the illustrated embodiment of the invention, this safety control embodies an electromagnet having a winding 8 arranged in a circuit 9 which preferably also has in series therewith a number of switches 4, 5, 6 and 7 of safety devices as, for instance, for protection against high temperature, high pressure, low water, an extinguished pilot flame and/or other undesired conditions. It is apparent that the opening of any one of these switches will break the circuit 9 which also receives its energy from the source of electricity or line-wires 1 and 2 and de-energize the electromagnet 8. This electromagnet controls a motor element preferably in the form of a weighted lever 34 and tends to hold said element in an elevated position. In this instance, this motor element is in the form of a lever pivoted at 41 to the casing and having at its outer end a weighted handle 41[a] by which the lever may be manually raised. The lever is held in the raised position by a detaining means comprising preferably a detent 44 on the lower end of the armature 36 of the electromagnet 8, said armature being pivoted at 37 and being normally pressed away from the electromagnet by a spring 38 to carry the detent out of detaining position. The detent is adapted to interlock with a shoulder or abutment 45 arranged on a projection extending upwardly from the pivoted lever or motor element 34.

The motor element or lever 34 is preferably connected with the valve 21 in such a manner that when it is released by the detaining means the lever 34 will effect the movement of the valve member in one direction, either closing or opening direction. This connection is preferably a lost motion connection so that when the lever is in a raised position, the valve member may be operated in either direction independently of the lever 34. The illustrated connection is a simple one and embodies a lateral projection 47 on the valve stem 20 engaged by a lateral projection 46 on the lever 34, the projection 46 lying above the projection 47 so that when the lever 34 is in its raised position, the projection on the stem may be moved independently thereof, but when the lever 34 is released by the detaining means, said lever will through the cooperating projections move the valve in one direction and hold it in that position, the weight of the lever being greater in force than the lifting means of the operating mechanism.

In order to render the valve operating mechanism or solenoid 12—13 inoperative, when the motor member 34 has been shifted on an undesired condition, the return wire 3 of the two circuits 10 and 11 is preferably provided with a switch contact 35 and this switch contact is situated in the housing 23 so that it may be engaged by the lever 34 which thereby acts as a switch member. The contact 35 has a binding post 43 connected thereto to which one terminal of the conductor 3 is connected, the other terminal being connected to a binding post 42 which is electrically connected with a combined motor and switch lever 34. It is apparent that as the switch lever 34 drops both of the circuits 10 and 11 will be cut out and consequently the solenoid 12—13 or operating means for the switch 10 cannot operate. If the switch lever 34 is moved upwardly by hand before the undesired condition has been cured, effecting the closing of the switches 4, 5, 6 or 7 which actuated upon the beginning of the undesired condition, the electromagnet 8 will not be energized and as a consequence the detent 44 will not be in detaining position and upon the release of the lever 34 it will again drop to hold the valve in the position to which it is shifted by the lever.

Figure 8:
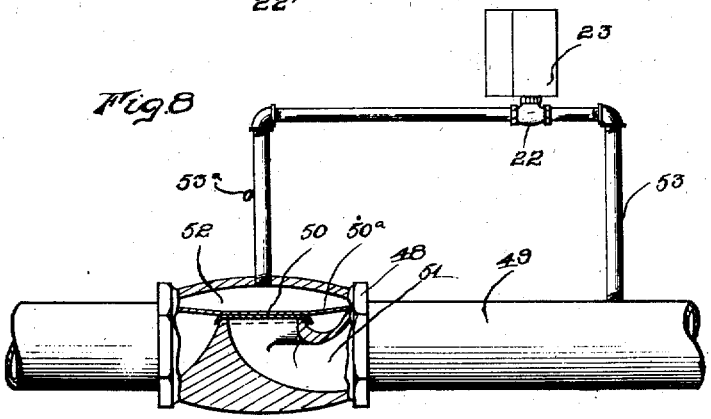
Fig. 8 is a view showing a construction for effecting the operation of a valve which is too large for direct operation by the operating means.
Figure 5:
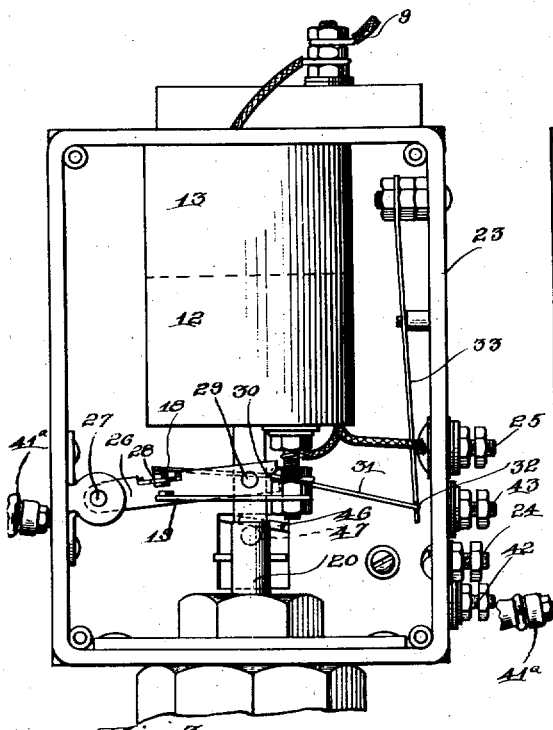
Fig. 5 is a section on the line 5—5, Fig. 1.

In Fig. 8, the valve, instead of being shifted to a closed position by the safety control, is shifted to an open position, but, in this instance, the valve is not the fuel supply valve. The fuel supply passes through a pipe 49 by way of a valve 48. The inlet passage to this valve is adapted to be closed at its upper end by a valve member 50 which is supported by a flexible diaphragm 50ᵃ. A chamber 52 is arranged above this diaphragm and connects by a by-pass 53 with a fuel supply pipe 49. In this by-pass, the valve 22 is arranged. Between the valve 22 and the chamber 50, the by-pass is provided with a bleeder opening 53ᵃ. The operation of this construction is such that the opening of the valve 22 permits fuel under pressure in the pipe 49 to pass above the diaphragm 50ᵃ. This fuel will have a pressure equal to the fuel pressure passing in the inlet 51 so that the valve member 50 moves to closed position under its own weight. After the undesired condition has been cured, the valve 22 will be closed instead of opened and the fuel above the diaphragm will leak out through the bleeder 53ᵃ, thereby reducing pressure above the diaphragm and permit the valve to open under the pressure in the inlet 51.

The operation of the invention will be understood from the foregoing, but it may be summarized as follows:

The valve 21 controlling the fuel supply 22 moves to opened and closed position under the control of the thermostat 14. During this operation of the valve the combined switch and motor member 34 is held in a raised position by the detent 44 and the circuit 9 has all of its switches 4, 5, 6 and 7 closed, so that the electromagnet 8 is energized and holds the detent 44 in detaining position. When any one of the switches 4, 5, 6 and 7 opens, the electromagnet 8 is deenergized and releases the motor member 34 which moves downwardly under its own weight and shifts the valve 21 in one direction, that is, to closed position as in Fig. 7, or to open position as in Fig. 8, and holds the valve in the shifted position. At the same time, the circuits 10 and 11 are opened through the switch lever 34 moving out of engagement with the contact 35, thereby making it impossible to operate the windings 12 and 13. The combined switch lever and motor member 34 is moved upwardly to detaining position, where it will be held again if the switches 4, 5, 6 and 7 are all closed and the line current is effective, but should all these conditions not exist, then the switch lever 34 will upon being released move back to its lower position and shift the valve, should the latter in the meantime have been operated through the windings 12 or 13.

It will be noted that the invention utilizes a closed circuit for the controlling means and in this way the failure of electricity will operate the controlling means. The controlling system may utilize any commercial form of valve operating mechanism, and its connection thereto may be effected in an inexpensive and simple manner.

What I claim as my invention and desire to secure by Letters Patent is:

1. The combination with a valve, of means for moving the valve in one direction, detaining means for holding said valve moving means against action, and an electric magnet arranged to hold the detaining means in detaining relation to the valve moving means.

2. The combination with a valve, of means for moving the valve in one direction, detaining means for holding said valve moving means against action, an electric magnet arranged to hold the detaining means in detaining relation to the valve moving means, and means for effecting the opening and the closing of the valve while the first mentioned moving means is held by the detaining means.

3. The combination with a valve having a stem provided with a projection, of a weighted member having a projection for engaging the projection on the stem to effect the movement of the valve in one direction, detaining means for holding the weighted member in the position, where the valve stem may move to open and close the valve, and an electromagnet holding said detaining means in detaining relation with the weighted member.

4. The combination with a valve having a stem provided with a projection, of a weighted member having a projection for engaging the projection on the stem to effect the movement of the valve in one direction, detaining means for holding the weighted member in the position where the valve stem may move to open and close the valve, an electromagnet holding said detaining means in detaining relation with the weighted member, and means for effecting the movement of the valve stem to open and close the valve while the weighted member is held by the detaining means.

5. The combination with a valve, of electrically operated means for effecting the opening and the closing of the valve, means for rendering said electrically operating means inoperative, having a normal tendency to move to a position where said electrically operated means will be inoperative, electrically operated means for holding said second mentioned means in the position where the electrically operated means will be operative, and a lost motion connection between said valve and said second mentioned means through which the valve may be operated in either of two directions while the electrically operated means is operative and will be moved in the other direction and held in its shifted position when the electrically operated means is inoperative.

6. The combination with a valve, electrically operated means for effecting the opening and the closing of the valve, and a thermostat controlling said means, of means for rendering said electrically operating means inoperative, having a normal tendency to move to a position where said electrically operating means will be inoperative, electrically operated means for holding said second mentioned means in a position where the electrically operated means will be operated, and a connection between the valve and said second mentioned means having provision which will permit the valve to operate in either one of two directions when the electrically operated means is operative and which will move the valve in one direction and hold it in its shifted position when the electrically operated means is inoperative.

7. The combination with a valve, of electrically operated means for effecting the opening and the closing of the valve, of a switch for rendering said electrically operated means inoperative, having a normal tendency to move to a position where said operative means will be inoperative, electrically operated detaining means for holding said switch in a position where the electrically operated means will be operative, and a connection between said valve and said switch which will permit the valve to be operated in either of two directions while the electrically operated means is operative and will cause the valve to be moved in the other direction and held in its shifted position when the electrically operated means is inoperative.

8. The combination with a valve, of a solenoid having two windings one of which moves the valve in one direction and the other of which moves the valve in the other direction, a stem connecting said solenoid with the valve, a weighted switch for opening the circuit to both windings, said switch having a normal tendency to move to open position, and a connection between the switch and the valve stem permitting the valve to operate in either one of two directions when the switch is closed, and moving the valve in one direction and holding it in such shifted position when the switch is opened.

9. The combination with a valve having a stem, of a solenoid having two windings and connected to the stem to move the latter in either of two directions, means operated by the stem for cutting out of the circuit the winding last operating the stem and placing in the circuit the winding next to operate the stem, means for holding the stem resiliently in its shifted position, a switch for cutting out both windings having a normal tendency to move to open position, electrically operated detaining means for holding the switch in closed position, and cooperating portions on the stem and the switch permitting the switch to move to closed position independently of the stem and moving the stem in one direction and holding in its shifted position when the switch is open.

In testimony whereof, I hereto affix my signature.

FRANK C. TAYLOR.